United States Patent
Nakashima et al.

(10) Patent No.: US 11,736,669 B2
(45) Date of Patent: Aug. 22, 2023

(54) IMAGE PROJECTION DEVICE, MEDIUM, AND IMAGE PROJECTION METHOD

(71) Applicant: TOYOTA JIDOSHA KABUSHIKI KAISHA, Toyota (JP)

(72) Inventors: Toyokazu Nakashima, Kasugai (JP); Ryuichi Kamaga, Nisshin (JP); Mitsuhiro Miura, Okazaki (JP); Yasuhiro Baba, Gifu-ken (JP); Tomokazu Maya, Nagoya (JP); Ryosuke Kobayashi, Nagakute (JP); Genshi Kuno, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/725,730

(22) Filed: Apr. 21, 2022

(65) Prior Publication Data
US 2022/0400237 A1 Dec. 15, 2022

(30) Foreign Application Priority Data
Jun. 11, 2021 (JP) .................................. 2021-098339

(51) Int. Cl.
*H04N 5/225* (2006.01)
*H04N 9/31* (2006.01)
*G06V 20/52* (2022.01)

(52) U.S. Cl.
CPC ........... *H04N 9/3179* (2013.01); *G06V 20/52* (2022.01)

(58) Field of Classification Search
CPC ...... H04N 9/3179; H04N 23/58; G06V 20/52; G02B 27/01
USPC ........................................................ 704/275
See application file for complete search history.

(56) References Cited

U.S. PATENT DOCUMENTS

| 2005/0251395 A1* | 11/2005 | Lich ...................... G02B 27/01 704/275 |
| 2018/0174463 A1* | 6/2018 | Ohta ..................... H04N 23/58 |
| 2018/0357836 A1 | 12/2018 | Ishiguro et al. |

FOREIGN PATENT DOCUMENTS

JP  2017-146963 A  8/2017

* cited by examiner

Primary Examiner — Abdul-Samad A Adediran
(74) Attorney, Agent, or Firm — Sughrue Mion, PLLC (57) ABSTRACT

An image projection device which is mounted on a vehicle or worn by a driver of the vehicle includes a control unit and a projection unit. The control unit accepts a selection for specifying a particular user, detects a current location, acquires an image showing at least a part of an appearance of the particular user, which is captured when the particular user has previously driven a particular user's vehicle at a location which is the same as or near to the current location, and projects the image onto a driver's seat of the vehicle by the projection unit.

20 Claims, 7 Drawing Sheets

| CLOSE RELATIVE ID | TRAVEL ROUTE | APPEARANCE IMAGE | VEHICLE OPERATION | SAFE DRIVING? |
|---|---|---|---|---|
| N01 | R01 | V01 | M01 | YES |
| N02 | R02 | V02 | M02 | NO |
| N03 | R03 | V03 | M03 | YES |

FIG. 5

```
PLEASE CHOOSE A CLOSE RELATIVE
YOU WANT TO PROJECT.

IMAGE PROJECTION DEVICE, MEDIUM, AND IMAGE PROJECTION METHOD

CROSS-REFERENCE TO RELATED APPLICATION

This application claims priority to Japanese Patent Application No. 2021-098339 filed on Jun. 11, 2021, incorporated herein by reference in its entirety.

BACKGROUND

1. Technical Field

The present disclosure relates to an image projection device, a program, and an image projection method.

2. Description of Related Art

Displaying a virtual space for providing entertainment on a head-mounted display worn by a passenger while a self-driving vehicle is driving is a widely-known technology (see, for example, Japanese Unexamined Patent Application Publication No. 2017-146963).

SUMMARY

Such a technology enables a passenger to enjoy playing games and reading. However, the passenger experience can be further improved.

The present disclosure provides an image projection device, a program, and an image projection method, each of which provides a realistic and visual experience of a particular user's driving to a driver of a vehicle.

An image projection device according to a first aspect of the present disclosure is mounted on a vehicle or worn by a driver of the vehicle. The image projection device includes a control unit and a projection unit. The control unit is configured to accept a selection for specifying a particular user, detect a current location, acquire an image showing at least a part of an appearance of the particular user, which is captured when the particular user has previously driven a particular user's vehicle at a location which is the same as or near to the current location, and project the image onto a driver's seat of the vehicle by the projection unit.

A program according to a second aspect of the present disclosure causes a computer, which is an image projection device mounted on a vehicle or worn by a driver of the vehicle, to accept a selection for specifying a particular user, detect a current location, acquire an image showing at least a part of an appearance of the particular user, which is captured when the particular user has previously driven a particular user's vehicle at a location which is the same as or near to the current location, and project the image onto a driver's seat of the vehicle.

An image projection method according to a third aspect of the present disclosure is performed by an image projection device which is mounted on a vehicle or worn by a driver of the vehicle. The image projection method includes accepting a selection for specifying a particular user, detecting a current location, acquiring an image showing at least a part of an appearance of the particular user, which is captured when the particular user has previously driven a particular user's vehicle at a location which is the same as or near to the current location, and projecting the image onto a driver's seat of the vehicle.

With the image projection device, the program, and the image projection method according to each aspect of the present disclosure, it is possible to provide a realistic and visual experience of the particular user's driving to the driver of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
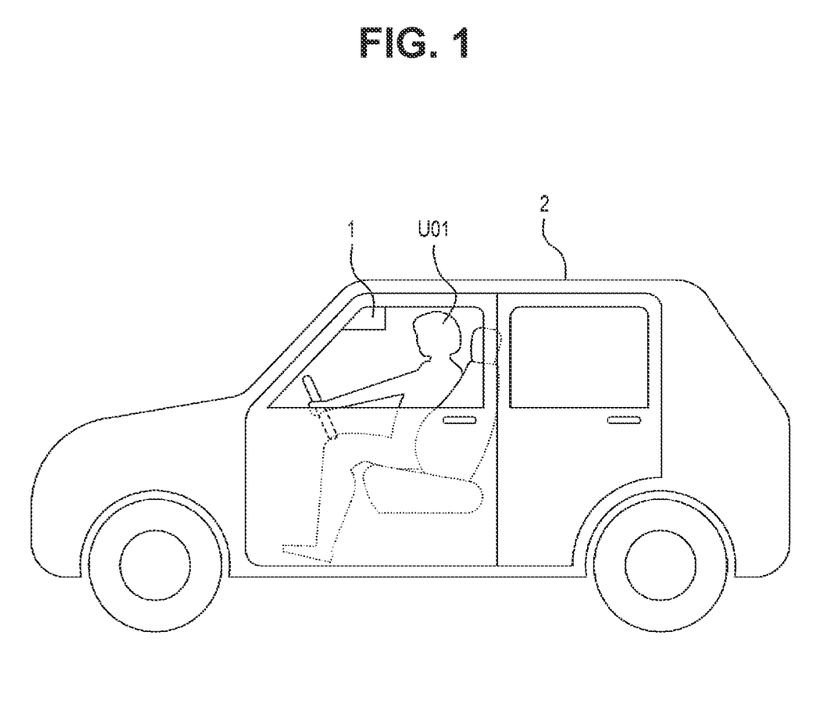
FIG. 1 is a schematic view illustrating an image projection device and a vehicle according to the present embodiment.

FIG. 1 is a schematic view illustrating an image projection device 1 and a vehicle 2 according to the present embodiment. The image projection device 1 is mounted on the vehicle 2. The image projection device 1 can establish communication with the vehicle 2 via, for example, a mobile communication network or the internet. The vehicle 2 is driven by a user U01.

The image projection device 1 is a device mounted at any position inside or outside the vehicle 2. In FIG. 1, the image projection device 1 is attached to a windshield, inside the vehicle 2, but may be attached at another position. The image projection device 1 projects an image into a real space. The image includes at least one of a still image and a moving image.

As an alternative example, the image projection device 1 may be a HUD (head-up display) mounted on the vehicle 2. As another alternative example, the image projection device 1 may be augmented reality (AR) glasses worn and operated by the user U01. The image projection device 1 projects the image into the real space, e.g., a virtual image.

As another alternative example, the image projection device 1 may be a head-mounted display worn and operated by the user U01. In this case, the image projection device 1 sets a virtual space and projects the image onto the virtual space.

Examples of the vehicle 2 include a gasoline vehicle, a diesel vehicle, an HV, a PHV, an EV, an FCV, and any other type of vehicle. "HV" is an abbreviation for hybrid vehicle. "PHV" is an abbreviation for plug-in hybrid vehicle. "EV" is an abbreviation for electric vehicle. "FCV" is an abbreviation for fuel cell vehicle. The vehicle 2 is driven by the user U01 in the present embodiment. As an alternative example, the vehicle 2 may be automated to a certain extent. The degree of autonomy of vehicles may be, for example, categorized as any of level 1 to level 5 according to the SAE level classification. "SAE" is an abbreviation for "Society of Automotive Engineers". The vehicle 2 may be a MaaS vehicle. "MaaS" is an abbreviation for "Mobility as a Service".

Hereinafter, an outlined process executed by the image projection device 1 of the present embodiment will be described. The image projection device 1 is mounted on the vehicle 2 or worn by the driver of the vehicle 2. A control unit 11 of the image projection device 1 accepts a selection for specifying a particular user, detects a current location, acquires an image showing at least a part of an appearance of the particular user, which is captured when the particular user has previously driven their vehicle at a location which is the same as or near to the current location, and projects the image onto a driver's seat of the vehicle 2. With this configuration, the driver of the vehicle 2 can closely see the image of the particular user's driving. The image projection device 1 provides a realistic and visual experience of the particular user's driving to the driver.

Figure 2:
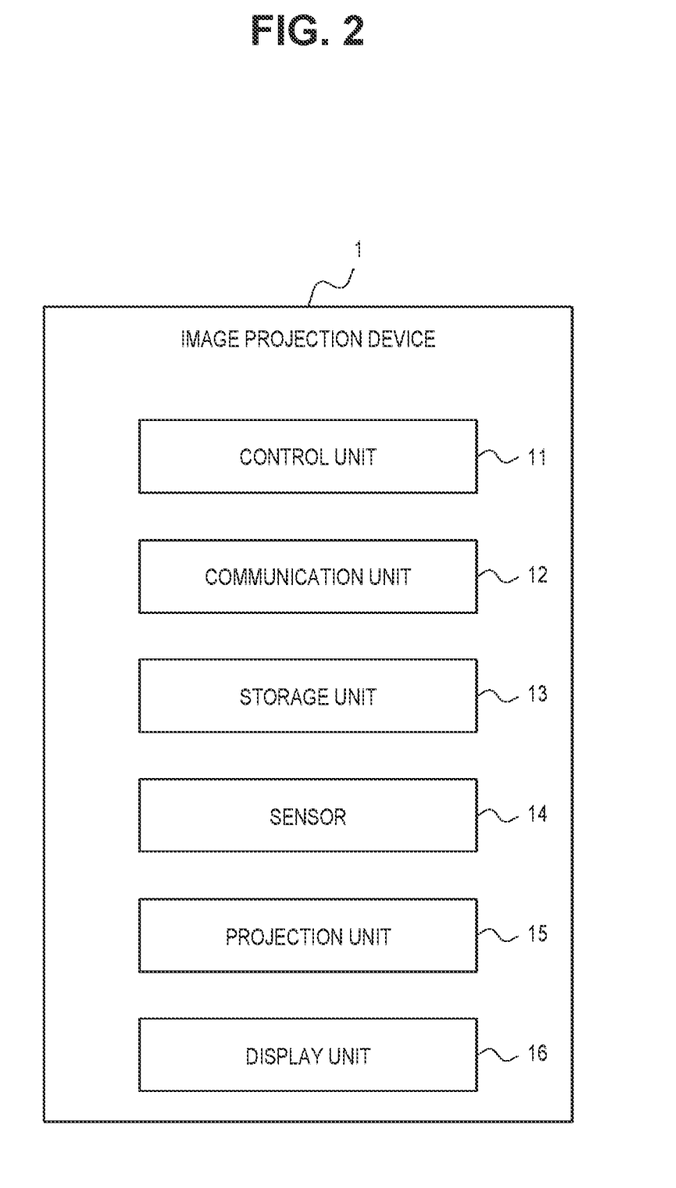
FIG. 2 is a block diagram illustrating a schematic configuration of the image projection device.

An internal configuration of the image projection device 1 will be described in detail with reference to FIG. 2.

The image projection device 1 includes a control unit 11, a communication unit 12, a storage unit 13, a sensor 14, a projection unit 15, and a display unit 16. Components of the image projection device 1 are communicably connected to each other via, for example, a dedicated line.

The control unit 11 includes, for example, at least one general-purpose processor including a central processing unit (CPU) or a micro-processing unit (MPU). The control unit 11 may include at least one dedicated processor specialized for a specific process. The control unit 11 may include at least one dedicated circuit instead of the processor. The dedicated circuit may be, for example, a field-programmable gate array (FPGA) or an application specific integrated circuit (ASIC). The control unit 11 may include an electronic control unit (ECU). The control unit 11 transmits and receives any information via the communication unit 12.

The communication unit 12 may include a communication module corresponding to at least one wired or wireless local area network (LAN) standard, which is used for connecting to the network. The communication unit 12 may include a module corresponding to at least one mobile communication standard such as Long Term Evolution (LTE), 4th Generation (4G) or 5th Generation (5G). The communication unit 12 may include a communication module corresponding to at least one short-range communication standard or specification, such as Bluetooth®, AirDrop®, IrDA, ZigBee®, FeliCa® or RFID. The communication unit 12 transmits and receives any information via the network.

The storage unit 13 can include, for example, a semiconductor memory, a magnetic memory, an optical memory, or a combination of at least two of those. The semiconductor memory is, for example, RAM or ROM. The RAM is, for example, SRAM or DRAM. The ROM is, for example, EEPROM. The storage unit 13 may function as, for example, a main storage device, an auxiliary storage device, or a cache memory. The storage unit 13 may store information on the results analyzed or processed by the control unit 11. The storage unit 13 may store various pieces of information on operation or control of the image projection device 1. The storage unit 13 may store a system program, an application program, embedded software, and the like. The storage unit 13 may be provided outside the image projection device 1 and accessed from the image projection device 1. The storage unit 13 includes a close relative database described later.

The sensor 14 may include a location information sensor. The location information sensor includes at least one GNSS receiver. "GNSS" is an abbreviation for global navigation satellite system. The GNSS includes, for example, at least one of GPS, QZSS, BeiDou, GLONASS, and Galileo. "GPS" is an abbreviation for Global Positioning System. "QZSS" is an abbreviation for Quasi-Zenith Satellite System. QZSS satellites are called quasi-zenith satellites. "GLONASS" is an abbreviation for Global Navigation Satellite System. The sensor 14 measures a location of the image projection device 1. The measurement result made by the sensor 14 is acquired by the control unit 11 as location information of the image projection device 1. The "location information" is information that can specify a location of the vehicle 2 and includes, for example, coordinates. The location of the image projection device 1 substantially coincides with the locations of the vehicle 2.

The sensor 14 may further include an image sensor. The image sensor includes a camera.

The sensor 14 further includes sensors for detecting driving details of the vehicle 2 or an interface with the sensors. The sensors include, for example, sensors for detecting a speed of the vehicle 2, longitudinal acceleration, lateral acceleration, deceleration, amount of accelerator operation, amount of brake operation, steering angle, selected eco-mode, odometer reading, engine specifications, and the like. The driving details can indicate driving operations, such as acceleration, deceleration, steering, engine braking, eco-mode selection, suitable driving path, and the like.

The display unit 16 may be an LCD or an organic EL display. "LCD" is an abbreviation for liquid crystal display. "EL" is an abbreviation for electro luminescence. The display unit 16 is visually recognized by the driver of the vehicle 2.

The display unit 16 may be connected to the vehicle 2 as an external output device instead of being provided in the image projection device 1. Any of schemes, for example, USB, HDMI (registered trademark) or Bluetooth (registered trademark), may be used as the connection.

In the embodiment where the image projection device 1 is a HUD, the display unit 16 may be a combiner.

Figure 3:
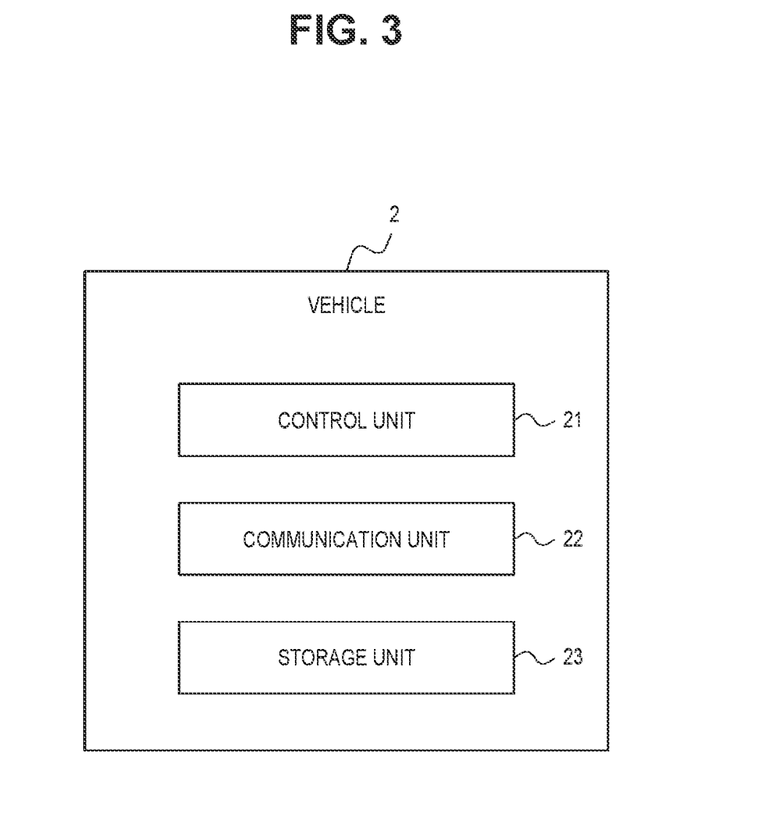
FIG. 3 is a block diagram illustrating a schematic configuration of the vehicle.

An internal configuration of the vehicle 2 will be described in detail with reference to FIG. 3.

The vehicle 2 includes a control unit 21, a communication unit 22, and a storage unit 23. Components of the vehicle 2 are communicably connected to each other via, for example, a dedicated line.

Hardware configurations of the control unit 21, the communication unit 22 and the storage unit 23 may be the same as the hardware configurations of the control unit 11, the communication unit 12, and the storage unit 13 of the image projection device 1. Therefore, explanations herein are omitted.

Hereinafter, a process executed by the image projection device 1 of the present embodiment will be described in detail. As an example, a situation will be described where the user U01 experiences the driving of the other person while driving the vehicle 2. The other person herein may be, for example, a close relative of the user U01 who has deceased.

The user U01 sends a request for the image projection device 1 to be operated to give an experience of the driving performed by a particular user. When receiving the request, the image projection device 1 refers to the storage unit 13.

Figure 4:
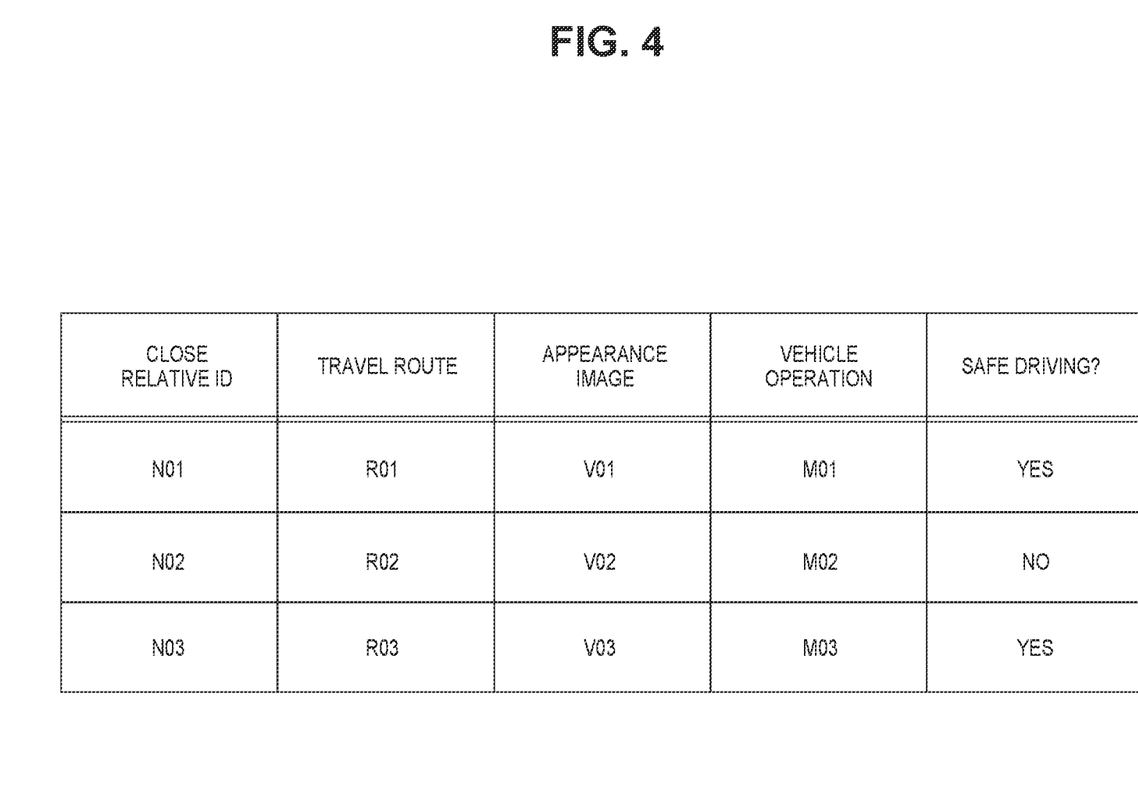
FIG. 4 is a diagram illustrating a data structure of a close relative database.

As shown in FIG. 4, the close relative database of the storage unit 13 stores a travel route (corresponding to a "Travel Route") when the close relative drove any vehicle, an image (corresponding to an "Appearance Image") showing an appearance of the close relative when they drove on the travel route, an operation (corresponding to a "Vehicle Operation") of a vehicle when the close relative drove on the travel route, and information (corresponding to "Safe Driving?") on whether or not the close relative performed safe driving, in association with a close relative ID. The information stored in the close relative database was collected by any device when the close relative was driving. A close relative N01 and a close relative N02 are stored as the close relatives of the user U01 in the close relative database.

Figure 5:
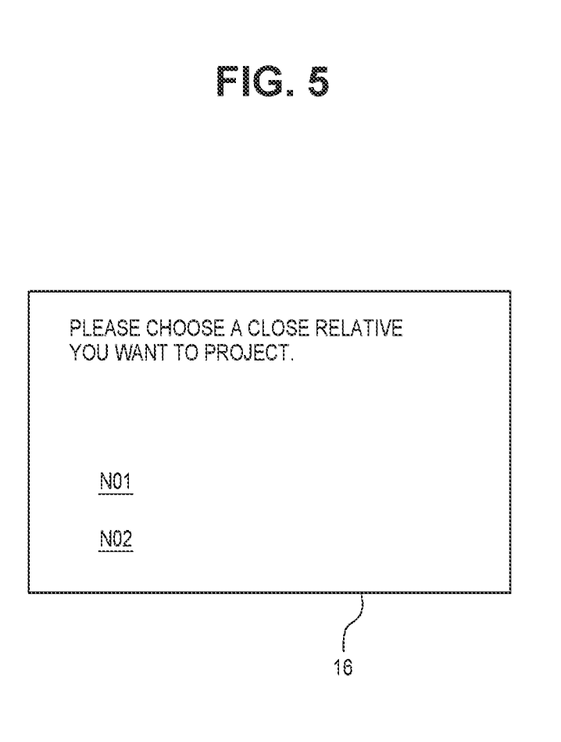
FIG. 5 is a diagram illustrating a display screen displayed on the image projection device.

As shown in FIG. 5, the control unit 11 displays on the display unit 16 a screen that asks to select an image to be projected, from among images showing the close relative N01 and the close relative N02. For a better understanding, a case where the close relative N01 is selected by the user U01 will be described. The control unit 11 accepts the selection made by the user U01 to specify the close relative N01.

The control unit 11 acquires information indicating the current location, from the sensor 14, to detect the current location. The current location is a location of the image projection device 1 or the vehicle 2. The control unit 11 determines a travel route of the vehicle 2 from the acquired information indicating the current location. The control unit 11 refers to the close relative database, and determines whether or not the close relative N01 has driven on a travel route including the travel route of the vehicle 2. A case where a travel route R01 includes the current travel route of the vehicle 2 will be described.

The control unit 11 acquires, from the close relative database, at least a part of an image V01 showing the appearance of the close relative N01 captured when the close relative N01 has driven a vehicle driven by the close relative N01 at a location the same as or near to the current location. The "location near to (the current location)" may indicate that those two locations are within a predetermined distance. The vehicle of the close relative N01 may be the vehicle 2 or another vehicle. The image V01 of the close relative N01 may be an image showing the entire appearance of the close relative N01, or may be an image showing a part of the appearance of the close relative N01.

Figure 6:
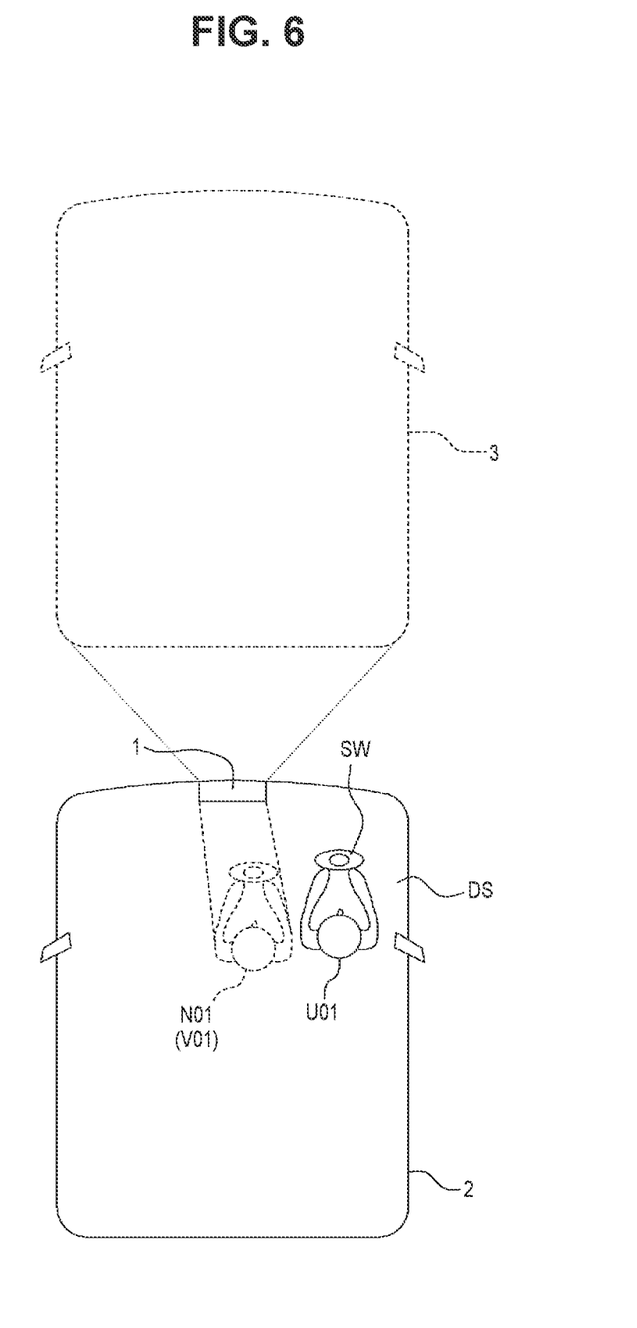
FIG. 6 is a diagram illustrating a projected image.

As shown in FIG. 6, the user U01 operates a steering wheel SW at a driver's seat DS of the vehicle 2 to drive the vehicle 2. The control unit 11 projects the image V01 of the close relative N01 on the driver's seat DS via the projection unit 15. The image V01 may be projected in the vicinity of the user U01, or at a position at which the image is at least partially superimposed over the user U01. The image V01 may include a steering wheel image. The user U01 can visually recognize the image V01 of the close relative N01 up close.

Further, the control unit 11 refers to the close relative database shown in FIG. 4, and acquires information indicating an operation M01 of the vehicle driven by the close relative N01 when the close relative N01 has driven their vehicle at a location which is the same as or near to the current location. As shown in FIG. 6, the control unit 11 of the image projection device 1 projects an image of a vehicle 3 that operates according to the operation M01 in the vicinity of the vehicle 2. As shown in FIG. 6, the image of the vehicle 3 is projected in front of the vehicle 2. As an alternative example, the image of the vehicle 3 may be projected at any position such as the side or rear of the vehicle 2. The image of the vehicle 3 may be projected at a position at which the image is at least partially superimposed over the vehicle 2.

As another alternative example, the control unit 11 may link the operation M01 of the vehicle driven by the close relative N01 to the operation of the vehicle 2 driven by the user U01. The vehicle 2 performs substantially the same operation as the vehicle driven by the close relative N01 under an automatic driving mode.

The control unit 11 refers to the close relative database and determines whether or not the operation M01 of the vehicle driven by the close relative N01 is certified as safe driving. As shown in FIG. 4, the operation M01 of the vehicle driven by the close relative N01 is certified as safe driving. The control unit 11 calculates a matching rate (that is, a sync rate) between the operation M01 of the vehicle driven by the close relative N01 and the operation of the vehicle 2 driven by the user U01.

When it is determined that the operation M01 of the vehicle driven by the close relative N01 is certified as safe driving, and that the matching rate between the operation M01 of the vehicle driven by the close relative N01 and the operation of the vehicle 2 driven by the user U01 exceeds a reference value, the control unit 11 notifies the user U01, who is the driver, of the determination result. The notification may be made by voice or displayed on a screen, by the image projection device 1 or the vehicle 2.

Figure 7:
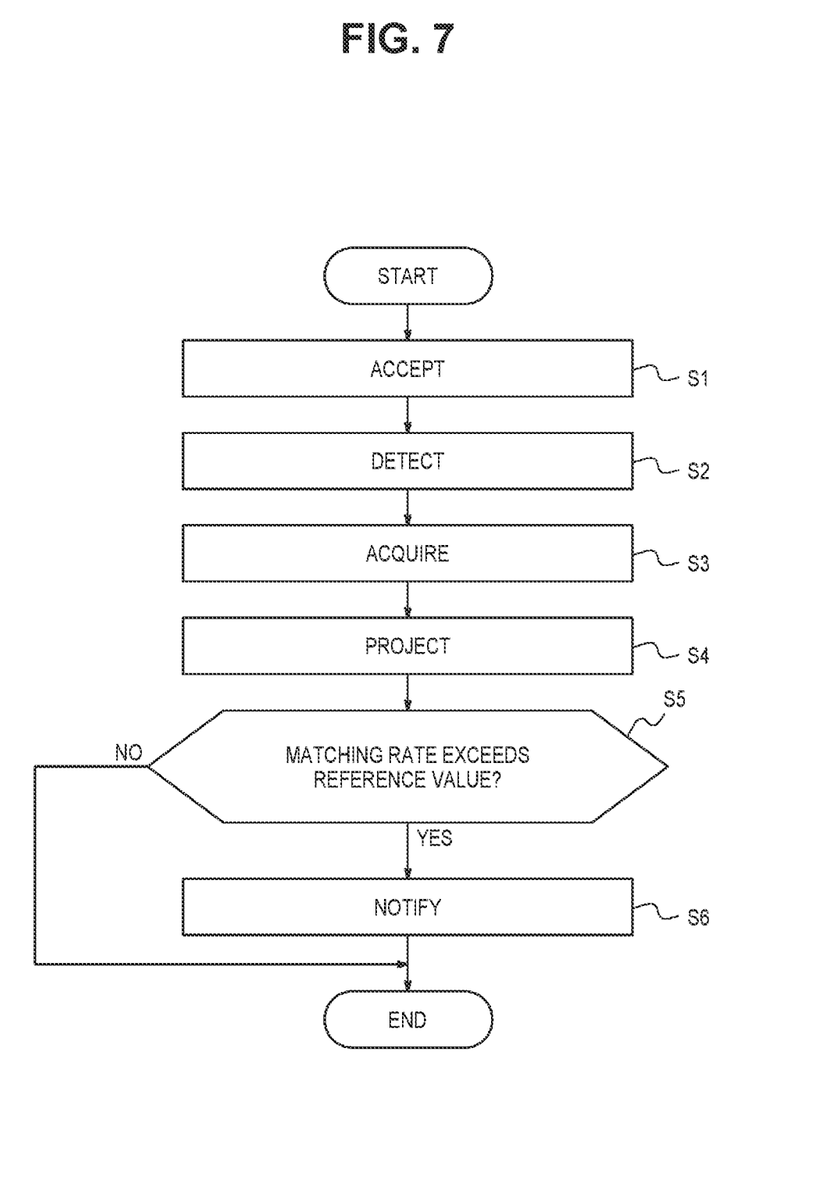
FIG. 7 is a flowchart illustrating an operation of the image projection device.

An image projection method performed by the image projection device 1 of the present embodiment will be described with reference to FIG. 7.

In step S1, the control unit 11 of the image projection device 1 accepts the selection from the user U01 to specify the particular user.

In step S2, the control unit 11 detects the current location of the image projection device 1 or the vehicle 2 by using the sensor 14.

In step S3, the control unit 11 acquires, from the storage unit 13, at least a part of the image captured of the appearance of the particular user when the particular user (for example, the close relative N01) has driven their vehicle at a location which is the same as or near to the current location.

In step S4, the control unit 11 projects the acquired image onto the driver's seat of the vehicle 2. The acquired image may be projected at a position at which the image is at least partially superimposed over the user U01 of the vehicle 2. The control unit 11 may further acquire the information indicating the operation of the particular user's vehicle when the particular user has driven their vehicle at a location the same as or near to the current location. The control unit 11 may project the acquired image in the vicinity of the vehicle 2, or alternatively, at a position at which the image is at least partially superimposed over the vehicle 2.

In a case where the operation of the particular user's vehicle is certified as safe driving, the control unit 11 determines whether the matching rate between the operation of the particular user's vehicle and the operation of the vehicle 2 of the user U01 exceeds the reference value in step S5.

When it is determined as "YES" in step S5, the control unit 11 notifies the user U01 of the determination result in step S6.

When it is determined as "NO" in step S5, the control unit 11 ends the flow.

According to the present embodiment stated above, the control unit 11 accepts a selection to specify the particular user, detects the current location, acquires the image showing at least a part of the appearance of the particular user, which is captured when the particular user has previously driven their vehicle at a location which is the same as or near to the current location, and projects the image onto the driver's seat of the vehicle 2. With this configuration, the driver of the vehicle 2 can closely see the image of the particular user's driving. The image projection device 1 provides a realistic and visual experience of the particular user's driving to the driver.

Furthermore, according to the present embodiment, the control unit 11 acquires the information indicating the operation of the particular user's vehicle when the particular user has previously driven such a vehicle at a location which is the same as or near to the current location, and projects the image of the vehicle that operates in response to the information in the vicinity of the vehicle 2 of the driver. As an alternative example, the control unit 11 may at least partially superimpose the image of the vehicle that operates in response to the information indicating the operation over the vehicle 2 of the driver. The control unit 11 may partially superimpose at least a part of the image of the particular user over the driver. With this configuration, the image projection device 1 provides a realistic and visual experience of the particular user's driving to the driver.

According to the present embodiment, the particular user may include the close relative of the driver. With this configuration, the image projection device 1 can give the driver an opportunity to experience the driving of the close relative who is close to the driver.

According to the present embodiment, when it is determined that the operation of the particular user's vehicle is certified as safe driving, and that the matching rate between the operation of the particular user's vehicle and the operation of the vehicle 2 driven by the driver exceeds the reference value, the control unit 11 notifies the driver, who is the driver, of the determination result. With this configuration, the control unit 11 can motivate the driver to drive safely, and thus can make a safer traffic environment.

Although the present disclosure has been described based on the drawings and examples, it should be noted that those skilled in the art may make various changes and modifications based on the present disclosure. Other changes or modifications can be made within a range not departing from the scope of the present disclosure. For example, functions included in each unit or each step can be rearranged without logical contradiction, and it is possible to combine a plurality of units or steps into a single component or divide a plurality of units or steps.

For example, the program that executes all or part of the functions or processing of the image projection device 1 can be recorded on a computer-readable recording medium in the embodiment stated above. The computer-readable recording medium includes a non-transitory computer-readable recording medium, and is, for example, a magnetic recording device, an optical disc, a magneto-optical recording medium, or a semiconductor memory. The program can be deployed or distributed by, for example, sales, transfer, or rent of a portable recording medium, such as a digital versatile disc (DVD) or a compact disc read only memory (CD-ROM), on which the program is recorded. The program may be stored in a storage of any server and transferred from the server to another computer for deployment or distribution. The program may be provided as a program product. The present disclosure can also be implemented as a program that can be executed by a processor.

The computer temporarily stores the program recorded in the portable recording medium or the program transferred from the server, for example, in the main storage device. Then, the computer causes the processor to read the program stored in the main storage device, and causes the processor to execute processing according to the read program. The computer may read the program directly from the portable recording medium and execute processing according to the program. The computer may sequentially execute the processing according to the received program each time the program is transferred from the server to the computer. Instead of transferring the program from the server to the computer, the processing may be executed by a so-called ASP service that implements the function only by instructing the execution and obtaining the result. "ASP" is an abbreviation for application service provider. The program includes information used for processing by an electronic computer, which is equivalent to the program. For example, data that is not a direct command to a computer but has the property of defining the processing of the computer corresponds to "equivalent to the program".

What is claimed is:

1. An image projection device which is mounted on a vehicle or worn by a driver of the vehicle, the image projection device comprising:
    a control unit; and
    a projection unit,
    wherein the control unit includes a processor configured to:
        accept a selection for specifying a particular user;
        detect a current location;
        acquire an image showing at least a part of an appearance of the particular user, which is captured when the particular user has previously driven the particular user's vehicle at a location which is same as or near to the current location; and
        project the image onto the driver's seat of the vehicle by the projection unit.

2. The image projection device according to claim 1, wherein the processor is configured to:
    acquire information indicating an operation of the particular user's vehicle when the particular user has previously driven the particular user's vehicle at the location which is the same as or near to the current location; and
    project an image of a vehicle that operates in response to the information indicating the operation in a vicinity of the vehicle of the driver.

3. The image projection device according to claim 1, wherein the processor is configured to:
    acquire information indicating an operation of the particular user's vehicle when the particular user has previously driven the particular user's vehicle at the location which is the same as or near to the current location; and
    at least partially superimpose an image of a vehicle that operates in response to the information indicating the operation over the vehicle of the driver.

4. The image projection device according to claim 1, wherein the processor is configured to:
    acquire information indicating an operation of the particular user's vehicle when the particular user has previously driven the particular user's vehicle at the location which is the same as or near to the current location; and
    link an operation of the vehicle of the driver and the operation of the particular user's vehicle.

5. The image projection device according to claim 1, wherein the processor is configured to at least partially superimpose the image showing at least a part of the appearance of the particular user over the driver.

6. The image projection device according to claim 1, wherein the particular user includes a close relative of the driver.

7. The image projection device according to claim 2, wherein the processor is configured to, when determining that the operation of the particular user's vehicle is certified as safe driving and that a matching rate between the operation of the particular user's vehicle and the operation of the vehicle of the driver exceeds a reference value, notify the driver of a determination result.

8. A vehicle equipped with the image projection device according to claim 1.

9. A non-transitory computer-readable medium storing a program that causes a computer of an image projection device mounted on a vehicle or worn by a driver of the vehicle to:
accept a selection for specifying a particular user;
detect a current location;
acquire an image showing at least a part of an appearance of the particular user, which is captured when the particular user has previously driven the particular user's vehicle at a location which is same as or near to the current location; and
project the image onto the driver's seat of the vehicle.

10. The non-transitory computer-readable medium according to claim 9, wherein the program causes the computer to:
acquire information indicating an operation of the particular user's vehicle when the particular user has previously driven the particular user's vehicle at the location which is the same as or near to the current location; and
project an image of a vehicle that operates in response to the information indicating the operation in a vicinity of the vehicle of the driver.

11. The non-transitory computer-readable medium according to claim 9, wherein the program causes the computer to:
acquire information indicating an operation of the particular user's vehicle when the particular user has previously driven the particular user's vehicle at the location which is the same as or near to the current location; and
at least partially superimpose an image of a vehicle that operates in response to the information indicating the operation over the vehicle of the driver.

12. The non-transitory computer-readable medium according to claim 9, wherein the program causes the computer to:
acquire information indicating an operation of the particular user's vehicle when the particular user has previously driven the particular user's vehicle at the location which is the same as or near to the current location; and
link an operation of the vehicle of the driver and the operation of the particular user's vehicle.

13. The non-transitory computer-readable medium according to claim 9, wherein the program causes the computer to at least partially superimpose the image showing at least a part of the appearance of the particular user over the driver.

14. The non-transitory computer-readable medium according to claim 9, wherein the particular user includes a close relative of the driver.

15. An image projection method performed by an image projection device which is mounted on a vehicle or worn by a driver of the vehicle, the image projection method comprising:
accepting a selection for specifying a particular user;
detecting a current location;
acquiring an image showing at least a part of an appearance of the particular user, which is captured when the particular user has previously driven the particular user's vehicle at a location which is same as or near to the current location; and
projecting the image onto the driver's seat of the vehicle.

16. The image projection method according to claim 15, further comprising:
acquiring information indicating an operation of the particular user's vehicle when the particular user has previously driven the particular user's vehicle at the location which is the same as or near to the current location; and
projecting an image of a vehicle that operates in response to the information indicating the operation in a vicinity of the vehicle of the driver.

17. The image projection method according to claim 15, further comprising:
acquiring information indicating an operation of the particular user's vehicle when the particular user has previously driven the particular user's vehicle at the location which is the same as or near to the current location; and
at least partially superposing an image of a vehicle that operates in response to the information indicating the operation over the vehicle of the driver.

18. The image projection method according to claim 15, further comprising:
acquiring information indicating an operation of the particular user's vehicle when the particular user has previously driven the particular user's vehicle at the location which is the same as or near to the current location; and
linking an operation of the vehicle of the driver and the operation of the particular user's vehicle.

19. The image projection method according to claim 15, further comprising:
at least partially superimposing the image showing at least a part of the appearance of the particular user over the driver.

20. The image projection method according to claim 15, wherein the particular user includes a close relative of the driver.

* * * * *